US010626848B2

(12) United States Patent
Boschitsch et al.

(10) Patent No.: US 10,626,848 B2
(45) Date of Patent: *Apr. 21, 2020

(54) LIFT-DRIVEN WIND TURBINE WITH FORCE CANCELING BLADE CONFIGURATION

(71) Applicant: CONTINUUM DYNAMICS, INC., Ewing, NJ (US)

(72) Inventors: Alexander H. Boschitsch, Cranbury, NJ (US); Alan J. Bilanin, Princeton, NJ (US); Glen D. Whitehouse, Skillman, NJ (US)

(73) Assignee: CONTINUUM DYNAMICS, INC., Ewing, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,765

(22) Filed: Jan. 4, 2019

(65) Prior Publication Data

US 2019/0136830 A1 May 9, 2019

Related U.S. Application Data

(63) Continuation of application No. 15/138,000, filed on Apr. 25, 2016, now Pat. No. 10,208,734.

(Continued)

(51) Int. Cl.
*F03D 3/06* (2006.01)
*F03D 3/00* (2006.01)
(Continued)

(52) U.S. Cl.
CPC ............ *F03D 3/062* (2013.01); *F03D 3/005* (2013.01); *F03D 9/25* (2016.05); *F03D 13/25* (2016.05);
(Continued)

(58) Field of Classification Search
CPC .... F05B 2240/214; F03D 3/005; F03D 3/062; F03D 3/0418; F03D 3/064; F03D 1/6658; F03D 80/00; F03D 7/06; Y02E 10/74
See application file for complete search history.

(56) References Cited

U.S. PATENT DOCUMENTS 1,835,018 A 12/1931 Darrieus
4,050,246 A 9/1977 Bourquardez
(Continued)

FOREIGN PATENT DOCUMENTS

CA 1151072 8/1983
CN 1719023 1/2006
(Continued)

OTHER PUBLICATIONS

"Wind Turbine Projects Run Into Resistance," New York Times, Aug. 26, 2010, http://www.nytimes.com/2010/08/27/business/energy-environment/27radar.html, last visited Sep. 14, 2016.
(Continued)

*Primary Examiner* — Dwayne J White
*Assistant Examiner* — Danielle M. Christensen
(74) *Attorney, Agent, or Firm* — David M. Quinlan, P.C.

(57) ABSTRACT

A lift-driven wind turbine has a turbine rotor with blades mounted to the turbine shaft by two struts hinged to the shaft and each blade to form a four-bar linkage. The blades' airfoil cross section generates lift that rotates the blades around the axis in the presence of a prevailing wind. The airfoil chord forms a geometric angle of attack $\alpha_G$ relative to the tangent of the blade path and the struts orient the blades with an outward tilt angle $\gamma$. The turbine is designed with values of $\alpha_G$ and $\gamma$ that cause the lift generated by each blade to have an upward component that supports the blade against the force of gravity and a mean radially inward component that substantially balances centrifugal forces on the blade. Wind
(Continued)

turbines designed according to the principles disclosed herein facilitate the construction of free-floating utility scale wind turbines for deep water installations.

34 Claims, 9 Drawing Sheets

Related U.S. Application Data

(60) Provisional application No. 62/178,917, filed on Apr. 23, 2015.

(51) Int. Cl.
*F03D 13/25* (2016.01)
*F03D 9/25* (2016.01)

(52) U.S. Cl.
CPC ....... *F05B 2240/214* (2013.01); *Y02E 10/727* (2013.01); *Y02E 10/74* (2013.01)

(56) References Cited

U.S. PATENT DOCUMENTS

| | | | |
|---|---|---|---|
| 4,087,202 A | 5/1978 | Musgrove |
| 4,105,363 A | 8/1978 | Loth |
| 4,204,805 A | 5/1980 | Bolie |
| 4,264,279 A | 4/1981 | Dereng |
| 4,293,279 A | 10/1981 | Bolie |
| 4,325,674 A | 4/1982 | Ljungstrom |
| 4,329,116 A | 5/1982 | Ljungstrom |
| 4,561,826 A | 12/1985 | Taylor |
| 4,624,624 A | 11/1986 | Yum |
| 4,630,996 A | 12/1986 | Masaki |
| 5,171,127 A | 12/1992 | Feldman et al. |
| 5,295,793 A | 3/1994 | Belden |
| 5,375,324 A | 12/1994 | Wallace et al. |
| 5,405,246 A | 4/1995 | Goldberg |
| 6,784,566 B2 | 8/2004 | Thomas |
| 6,974,309 B2 | 12/2005 | Seki |
| 7,156,037 B2 | 1/2007 | Borgen |
| 7,397,144 B1 | 7/2008 | Brostmeyer et al. |
| 7,456,515 B2 | 11/2008 | Nielsen |
| 7,677,862 B2 | 3/2010 | Boatner |
| 7,750,492 B1 | 7/2010 | Ryznic et al. |
| 7,967,569 B2 | 6/2011 | Yan |
| 7,980,810 B2 | 7/2011 | Unno |
| 7,988,413 B2 | 8/2011 | Harr |
| 8,038,383 B2 | 10/2011 | Sharpe |
| 8,169,099 B2 | 5/2012 | Roznitsky et al. |
| 8,272,840 B2 | 9/2012 | Yan |
| 8,322,989 B2 | 12/2012 | Ozkul |
| 9,631,503 B2 | 4/2017 | Ehmberg |
| 9,702,344 B2 | 7/2017 | Skaare |
| 2003/0168864 A1 | 9/2003 | Heronemus et al. |
| 2006/0269396 A1 | 11/2006 | Borgen |
| 2007/0269311 A1 | 11/2007 | Browning |
| 2008/0095608 A1 | 4/2008 | Boatner |
| 2009/0091136 A1 | 4/2009 | Viterna |
| 2010/0003134 A1 | 1/2010 | Edwards et al. |
| 2010/0008733 A1 | 1/2010 | Stiesdal |
| 2010/0172759 A1 | 7/2010 | Sullivan |
| 2010/0215492 A1 | 8/2010 | Domenech Barcons |
| 2011/0042958 A1 | 2/2011 | Vander Straeten |
| 2011/0133474 A1 | 6/2011 | Haar |
| 2011/0140420 A1 | 6/2011 | Loh et al. |
| 2011/0140426 A1 | 6/2011 | VelundGarcia Lopez et al. |
| 2011/0311360 A1 | 12/2011 | Nedrebo et al. |
| 2012/0091715 A1 | 4/2012 | Ozkul |
| 2012/0171034 A1 | 7/2012 | Gabeiras et al. |
| 2013/0052015 A1 | 2/2013 | Velund |
| 2014/0147248 A1 | 5/2014 | Akimoto |
| 2016/0177927 A1 | 6/2016 | Saeki et al. |

FOREIGN PATENT DOCUMENTS

| | | |
|---|---|---|
| DE | 10 2007 062616 | 6/2009 |
| KR | 10 2009 0112469 | 10/2009 |
| MD | 3847 | 2/2009 |
| WO | 2011/021733 | 2/2011 |

OTHER PUBLICATIONS

Paquette, Joshua, et al., "Innovative Offshore Vertical-Axis Wind Turbine Rotor Project," Proc. of European Wind Energy Assoc., Copenhagen, Denmark, Apr. 16-19, 2012.

"Vertiwind: Making Floating Wind Turbine Technology Competitive for Offshore," Nenuphar, S.A., Oct. 2012, http://www.twenties-project.eu/system/files/2_2013-03%20Presentation%20short.pdf, last visited ).

Whitehouse, Glen R., et al., "Variable Geometry Wind Turbine for Performance Enhancement, Improved Stability and Reduced Cost of Energy," Wind Energy, John Wiley & Sons, Ltd. published online at http://onlinelibrary.wiley.com/doi/10.1002/we.1764/full (May 15, 2014).

Ragheb, M., "Vertical Axis Wind Turbines," Mar. 21, 2015, http://mragheb.com/NPRE%20475%20Wind%20Power%20Systems/Vertical%20Axis%20Wind%20Turbines.pdf, last visited Jun. 22, 2016.

"The Nenuphar Solution—Nenuphar Wind," Nenuphar, S.A., 2015, http://www.nenuphar-wind.com/en/15-the-nenuphar-solution.html.

"Nenuphar Presentation," 4eme Convention Internationale des Energies Marines Renouvelables, Nantes, FR, May 20-21, 2015.

Wikipedia, "Verticle axis wind turbine," https://en.wikipedia.org/wiki/Verticle_axis_wind_turbine, p. 3 (last visited Oct. 22, 2018).

LIFT-DRIVEN WIND TURBINE WITH FORCE CANCELING BLADE CONFIGURATION

CROSS-REFERENCE TO RELATED APPLICATION

This application claims the benefit of U.S. provisional application No. 62/178,917, filed Apr. 23, 2015, the entire contents of which are incorporated herein by reference.

BACKGROUND OF THE INVENTION

Field of the Invention

The present invention relates to vertical axis lift-driven wind turbines, and more particularly, to vertical axis wind turbines with blade configurations that ameliorate gravitational and centrifugal forces.

Description of Related Art

Wind energy is an appealing source of renewable energy, and horizontal axis wind turbines (HAWT) have emerged as the predominant wind turbine configuration over the past 30 years and even up to the present, primarily due to advantages in rotor costs for turbines with power generating capacities less than 5 MW. However, HAWTs have shortcomings as well. They require a control mechanism to keep them pointed into the prevailing wind. They are subject to fatigue because the rotor blades are cantilevered from a horizontal generator axis, which subjects them to regular, periodic stresses due to gravity as they rotate. Fatigue issues are aggravated as the blades get longer and heavier for turbines with higher power ratings. Longer rotor blades are also more susceptible to aeroelastic effects, which further contribute to fatigue and can reduce blade life even more. To counter the effects of fatigue, the blades, and the HAWT tower carrying them, must be made more robust, which uses more material than would otherwise be necessary and thus increases cost.

Another disadvantage of HAWTs is that the blade roots have to be mounted at the top of a tower, sometimes hundreds of feet tall, where they are connected to a generator. This increases the cost of maintenance and repairs to the generator and its associated machinery. The elevated location of the generator also complicates HAWT installation offshore because it presents problems in anchoring the base of the tower, even one of modest height. Moreover, anchoring a top heavy HAWT tower to the seabed in relatively shallow water still requires expensive infrastructure that is typically not needed for land-based installations, and is even more challenging in deep water because the tower must be supported by a free-floating platform. The problems encountered with offshore installations, particularly in deep water locations, are obviously exacerbated as the HAWT is made larger and taller, and thus heavier, to increase power generating capacity.

A vertical axis wind turbine (VAWT) can avoid many of these problems. There are myriad VAWT configurations, some of which are discussed in Whitehouse, Glen R., et al., "Variable Geometry Wind Turbine for Performance Enhancement, Improved Stability and Reduced Cost of Energy," *Wind Energy*, John Wiley & Sons, Ltd. published online at http://onlinelibrary.wiley.com/doi/10.1002/we.1764/full (May 15, 2014). One type of prior art VAWT that can be adapted for application of the present invention is depicted in FIG. 1. This is a simplified representation of what is sometimes referred to as an "H-rotor" design, in which each of a pair of blades 1 is mounted to the outer end of a respective strut 2 to form the characteristic "H" shape of this design. The inner ends of the struts are attached at the top of a rotating vertical shaft 3 inside a tower 4, which is supported by a frame 5. The shaft 3 is attached to a generator 6 at the base of the tower for generating electricity as the shaft rotates. There are numerous variations on this concept, with various blade mounting arrangements and adjustable blade orientations. See, for example, U.S. Pat. Nos. 1,835,018, 4,105,363, 4,204,805, 4,293,279, 4,325,674 (FIG. 7), U.S. Pat. Nos. 6,784,566, 6,974,309, 7,677,862, and 8,322,989, and Korean Pub. No. 10-2009-0112469.

FIGS. 2 and 3 illustrate the manner by which a lift-driven VAWT rotates a shaft in the presence of a prevailing wind $U_W$. (Other types of VAWTs can be classified as "drag-driven," which work on the same principle as the familiar cup-shaped anemometer impeller.) FIG. 2 illustrates that a rotor blade 1 rotates about an axis A of the shaft 3 in the direction of the arrow drawn around the axis. FIG. 3 illustrates notionally how lift generated by the blades in the presence of a prevailing wind creates a rotational force on the shaft 3. For the sake of illustration, the blades in FIG. 3 are depicted at a point in their travel about the axis A where the prevailing wind vector is perpendicular to the blade chord c with a velocity of $U_W$. Due to the rotation of the blade, there is also an airflow vector parallel to the blade path that corresponds to the tangential velocity $V_T$ of the blade. If the blade has no twist and wake-induced effects are discounted, the resulting airflow velocity $V_R$ approaches the blade at an angle of attack α relative to the chord c. (A further simplification assumes that there is no structural deformation of the blade.) According to known principles of aerodynamics, the blade 1 generates lift primarily as a function of α and $V_R$. As seen in FIG. 3, the resulting notional lift vector will have a component in a direction tangential to the path of the blade 1 that causes the shaft 3 to rotate about the axis A.

The construction of a VAWT of this general configuration has a number of advantages over an HAWT, a principal one being that it is independent of the direction of the prevailing wind. The turbine blades are also comparatively straightforward to design and manufacture because of their relatively simple geometry as compared to HAWT blade airfoils that twist and change chord along their span. VAWT rotor blades can be "furled," by folding the struts and blades inwardly toward the axis of rotation, to minimize the possibility of damage caused by excessive wind velocities during storms. They are not subject to periodic bending stresses due to gravity as they rotate, which theoretically permits VAWTs to be scaled up to very large sizes. VAWT power generating machinery is located at its base, which together with a potentially larger power generating capacity, makes VAWTs good candidates for mounting on floating platforms in deep water because they can be made large enough to generate significant amounts of electricity and be sited far enough offshore so they cannot be seen from coastal areas in spite of their size. These and other advantages of VAWTs for offshore installation are discussed in more detail in Paquette, Joshua, et al., "Innovative Offshore Vertical-Axis Wind Turbine Rotor Project," *Proc. of European Wind Energy Assoc.*, Copenhagen, Denmark, Apr. 16-19, 2012.

However, lift-driven VAWTs with this type of H-rotor configuration (cantilevered, generally vertical blades rotating about a central axis) present their own design challenges. For one thing, the rotating blades are subject to the centrifugal forces $CF_p$ shown in FIG. 2, which increase as the blades are made larger and thus heavier. Moreover, the horizontally directed lift generated by the blades varies as they revolve about the axis and present periodically varying angles of attack to the prevailing wind, thus subjecting them to periodic lift forces that can cause the blades to fatigue. Making the blades stronger to resist fatigue failure means also making them heavier, so that the struts supporting the blades against the force of gravity must also be made stronger and thus heavier and more costly. Additional struts can be used, but that also adds to weight and cost, and complicates the design, particularly if it is desired to incorporate mechanisms to furl the rotor blades.

Large (utility-scale) VAWT technology is not as mature as that for HAWTs, with no systems being offered or produced by existing utility-scale turbine manufacturers. VAWTs produced in the 1980s that were considered utility-scale at the time are too small to be considered as such (by a factor of ten or more) by current standards. As a result, VAWTs have not found widespread acceptance for utility scale power generation facilities because a practicable VAWT must be made large enough to approach or exceed the power generating capacity per unit cost (including design, construction, and installation) of a comparable HAWT with the same capacity.

Traditional approaches to engineering wind turbines have treated aerodynamic and structural design independently, by settling first on an aerodynamic design that maximizes power generating efficiency, and then designing the structure necessary to take the resulting loads. This often results in large, costly structures, which may not even be feasible with currently known materials, manufacturing technologies, and construction techniques when applied to the next generation of offshore designs. However, there are some examples of departures from the traditional design approach. U.S. Pat. No. 4,293,279 describes a modified H-rotor-type VAWT system with an oval ring-like blade in which the ring shape is designed to cancel the bending moment on the blade itself due to centrifugal force, but it does not address the effects of centrifugal forces on the rest of the structure, nor does it address any design issues relating to weight. U.S. Pat. No. 4,561,826 describes a number of VAWT configurations with counter balanced cantilevered blades that pivot and gimbal on the top of a tower. In this design, the resulting blade angle of inclination for a given wind speed is established when equilibrium is reached among aerodynamic, gravitational, and centrifugal forces on the blade. However, this only addresses operational features and does not solve problems, including those discussed above, that have thus far presented a barrier to scaling up VAWTs to sizes which will be more feasible for a wide variety of commercially applications. Finally, U.S. Pat. No. 8,083,383 discloses a VAWT with blades attached to inclined struts mounted to a base at an angle that form a V-shaped rotor. The blades are mounted at angles designed to reduce the overturning/tipping moment on the structure and thus improve stability, but this patent does not address structural design problems encountered when attempting to scale up VAWTs to the large sizes required to compete effectively with the presently well entrenched, widespread use of HAWTs.

SUMMARY OF THE INVENTION

It is an object of the present invention to develop a VAWT configuration that exploits aerodynamics to reduce stresses due to gravity (weight) loading and to reduce the radial loads (centrifugal force and peak unsteady aerodynamic force) on the rotating turbine blades, and thus minimizes structural cost through weight reduction and extended fatigue life.

One general aspect of the subject matter disclosed herein involves designing a lift-driven vertical axis wind turbine that minimizes overall cost, including those related to construction, installation, and service and maintenance. The design takes into account design parameters that play significant roles in determining those costs such as weight, number of moving parts, and amenability to low cost fabrication of wind-driven components for given power generating specifications. These factors are optimized to achieve target power generation capacity at design operating conditions and to ensure that steady-state and fluctuating stresses in the structure are within acceptable ranges.

Other general and specific aspects, details, embodiments, and adaptations of a VAWT in furtherance of the objects of the subject matter herein are described below in the context of certain specific embodiments of the claimed subject matter.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

Figure 1:
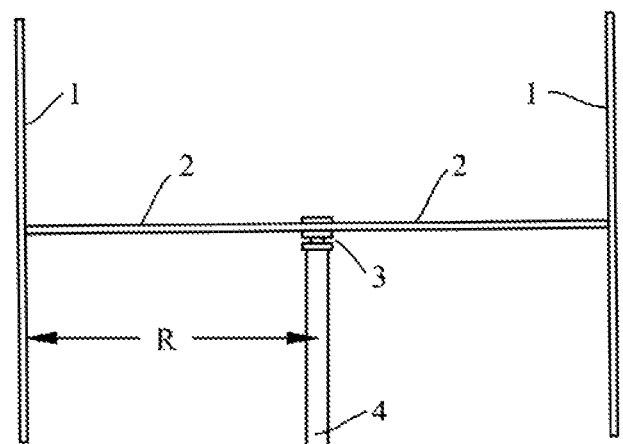
FIG. 1 is a simplified schematic depiction of a prior art lift-driven H-rotor VAWT.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

In general, terms used throughout have the ordinary and customary meaning that would be ascribed to them by one of ordinary skill in the art. However, some of the terms used in the description herein will be explicitly defined and that definition is meant to apply throughout. For example, the term is "substantially" is sometimes used to indicate a degree of similarity of one property or parameter to another. This means that the properties or parameters are sufficiently similar in value to achieve the purpose ascribed to them in the context of the description accompanying the use of the term. Exact equivalence of many properties or parameters discussed herein is not possible because of factors such as engineering tolerances and normal variations in operating conditions, but such deviations from an exact identity still fall within the meaning herein of being "substantially" the same. Likewise, omission of the term "substantially" when equating two such properties or parameters does not imply that they are identical unless the context suggests otherwise.

I. SOME GENERAL PRINCIPLES UNDERLYING THE INVENTION

An important aspect of the invention seeks to provide a VAWT configuration and method of designing same that permits optimization of certain design parameters to achieve a target power generation capacity in which steady-state and fluctuating stresses are maintained at acceptable levels for the materials used to fabricate the machine. Toward that end, a VAWT configuration is disclosed in which the average loads resulting from aerodynamic, gravitational, and centrifugal forces are minimized, and optimally balanced, and the blade and strut structural components are configured so that they support the loads exerted on them predominantly via tensile rather than bending stresses. Methods for designing a VAWT that achieves those goals are also described.

Other highly desirable operational features include (i) a variable geometry feature whereby the blades can be stowed during high wind conditions or positioned in a desired operational orientation, (ii) a self-stabilizing operational mode that incorporates into the design force derivatives (that is, the change in lift with respect to changes in wind speed) that tend to restore the configuration to its design operating condition, (iii) avoiding blade stall at the design operating condition, (iv) enabling the turbine to start spontaneously from rest by incorporating a non-zero geometric angle of attack $\alpha_G$ (defined further below) and/or cambered or twisted rotor blades, and (v) acceptable aeroelastic stability over the operating range. Another desirable goal is to maximize the efficiency of the interface between the rotating turbine shaft and the electrical generator. For example, it may be desirable to be able to operate the turbine at a constant rotation rate over a range of wind speeds, which would reduce the cost of operating the generator by reducing drivetrain loads and possibly even enabling the use of a fixed RPM generator. Another feature of the invention takes into account the dynamics of the turbine support platform, particularly for sea-based, deep water installations.

A. VAWT Embodiment According to One Aspect of the Invention

Figure 4:
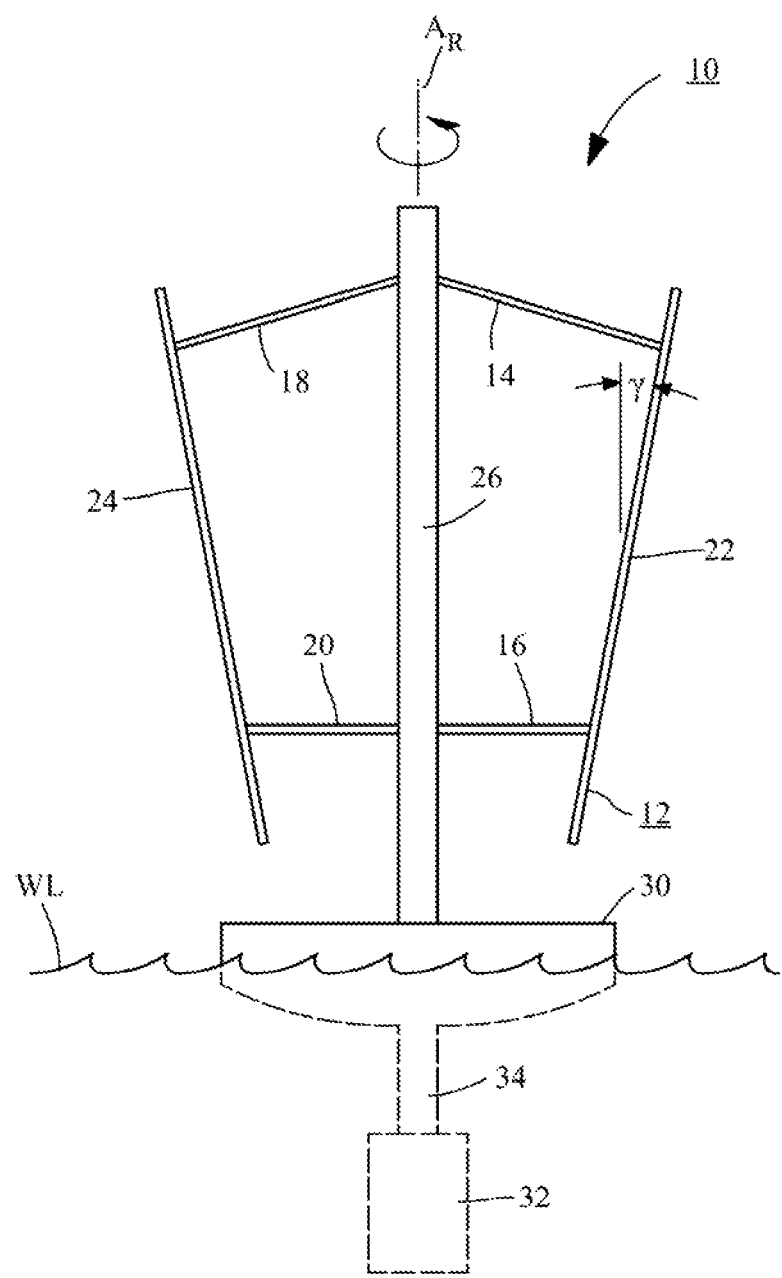
FIG. 4 is a schematic depiction of an embodiment of a tilted rotor VAWT incorporating aspects of the invention described herein.

The configuration shown schematically in FIG. 4 comprises an embodiment of a tilted-blade, modified H-rotor VAWT 10 designed to achieve certain objects of the present invention. The turbine 10 includes a rotor 12 that comprises struts 14, 16, 18, and 20, and two blades 22 and 24 mounted by the struts to a tower assembly 26. The blades are designed to cause rotation of a shaft carried by the tower assembly about an axis $A_R$ in the fashion of a lift-driven VAWT as described above. The direction of rotation of the rotor is denoted by the arrow drawn around the axis in FIG. 4. The present embodiment comprises a two-blade rotor, with the blades 22 and 24 mounted 180° apart, but the invention contemplates rotors with more blades, which will preferably be equally spaced circumferentially around the tower.

The VAWT 10 is shown mounted to a free-floating support platform 30 to suggest a particularly advantageous application of the VAWT 10, in which a compartment 32 submerged below the water level WL houses a conventional electrical generator and associated machinery. The platform is illustrated in highly schematic form, and in reality will include sufficient superstructure to support the presence of necessary service personnel. The rotating shaft is operatively connected to the generator through a protective casing 34, which can be made large enough to permit service personnel to descend to the submerged compartment for repairs and maintenance. Although the generator and associated machinery can be on the platform, the arrangement shown permits the heavy generating equipment to act as ballast to steady the above water VAWT against transient sideways loads from wind gusts, heavy seas, and the like, without requiring that the platform be anchored to the seabed. It will be understood by those skilled in the art that the VAWT 10 is not limited to the application shown, and can be used on land or in shallow water locations with a supporting platform anchored to the seabed.

Figure 2:
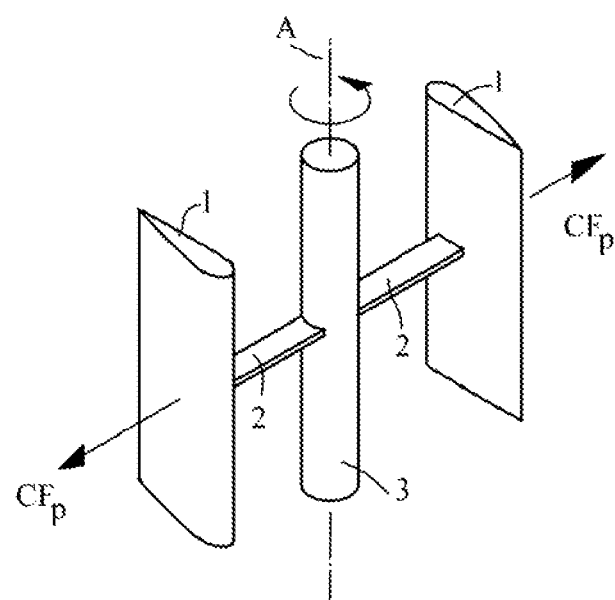
FIG. 2 is a schematic isometric view illustrating the operation of a conventional two-bladed lift-driven VAWT such as that shown in FIG. 1.
Figure 2:
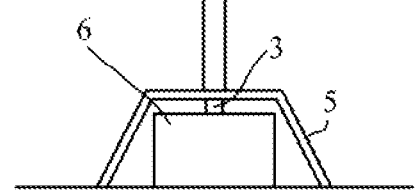
Figure 3:
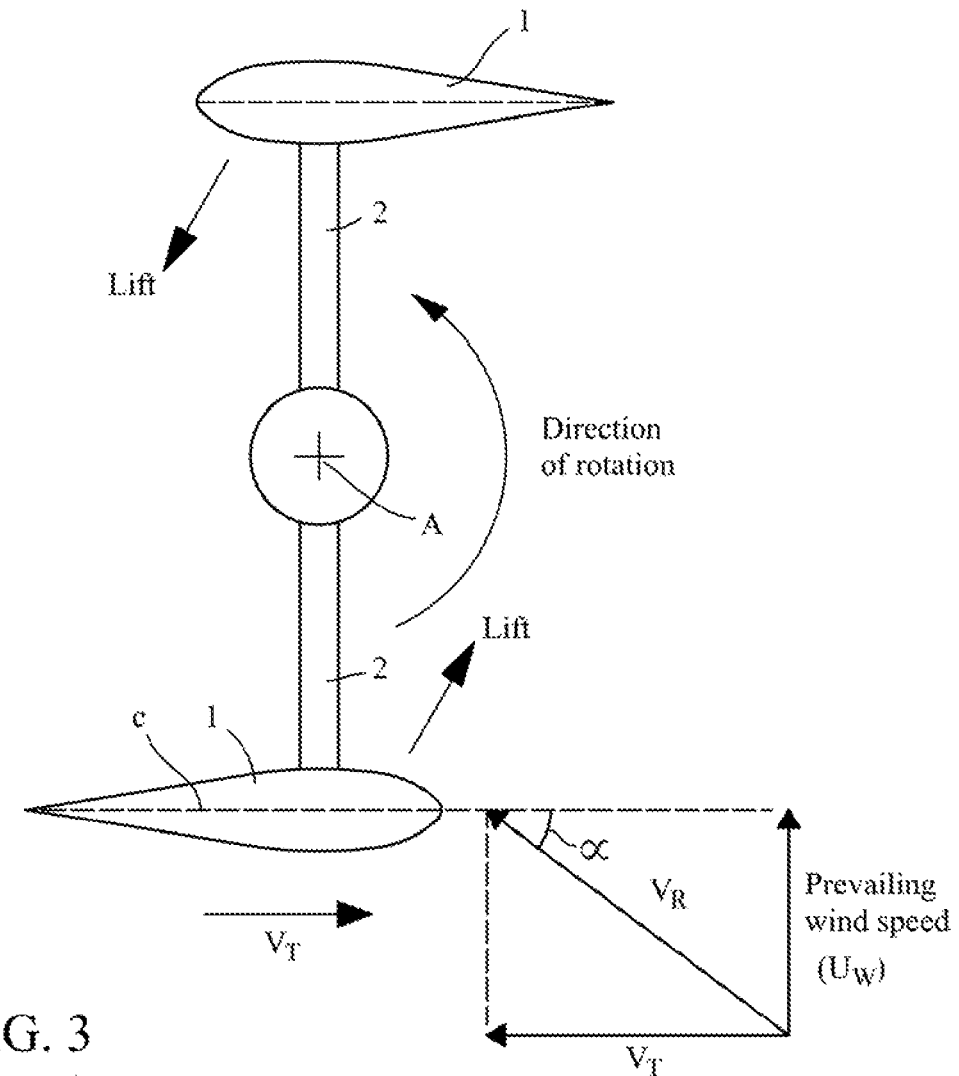
FIG. 3 is cross section of the rotor in FIG. 2 taken perpendicular to its axis of rotation, with a simplified illustration of aerodynamic forces on the rotor blades in the presence of a prevailing wind.
Figure 5:
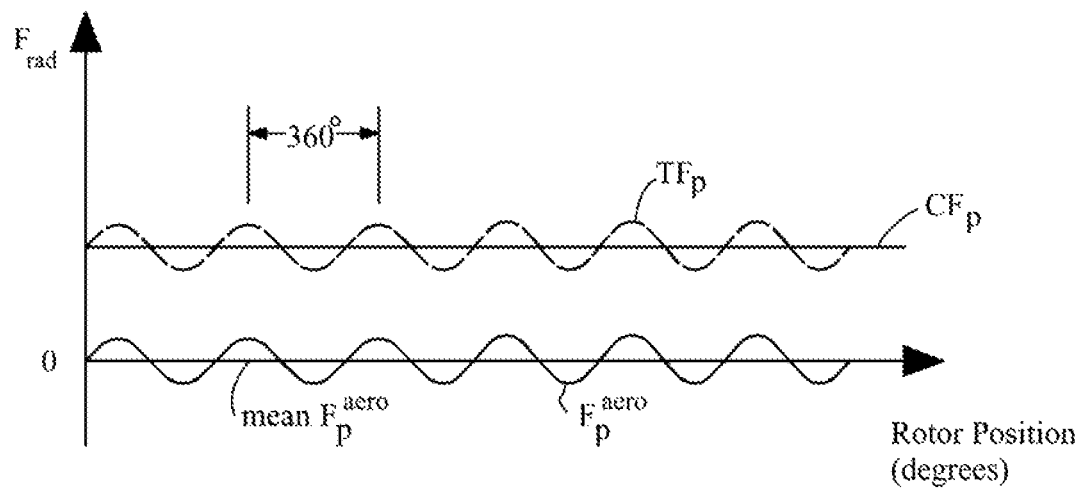
FIG. 5 is a notional depiction of the radial forces on a rotor blade in a prior art H-rotor VAWT such as that shown in FIG. 1.
Figure 6:
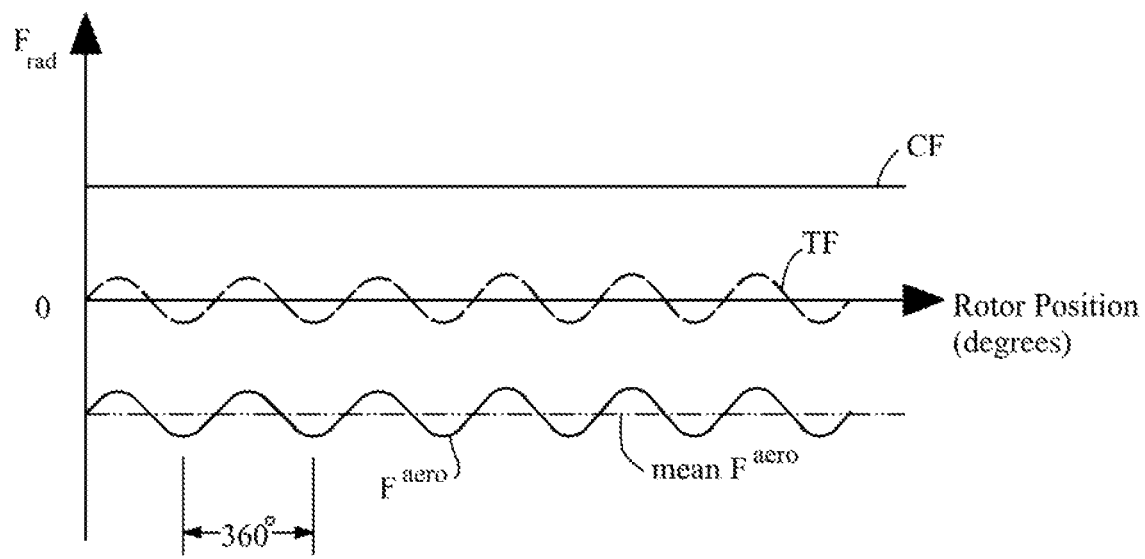
FIG. 6 is a notional depiction of the radial forces on a rotor blade of a tilted rotor VAWT incorporating a centrifugal force cancelling design as described herein.

One important object of the invention can be appreciated by first considering the radial forces $F_{rad}$ on a rotor blade vs. the angular position of the rotor as it rotates about the turbine axis, plotted notionally in FIGS. 5 and 6. In a prior art H-rotor VAWT such as that shown in FIGS. 1 and 2, a blade 1 is subject to a steady-state centrifugal force $CF_P = m \times R \times \Omega^2$, where m is the mass of the blade 1, R is the distance of the blade from the axis A, and $\Omega$ is the angular velocity of the blade. For a utility scale wind turbine generating at least 5 MW of power, the blades can be longer than 50 meters, sometimes more, resulting in a substantial mass. Depending on the velocity of the prevailing wind $U_W$, the rotor can reach a tip speed $\Omega \times R$ in excess of five times $U_W$. Those skilled in the art will appreciate that the centrifugal force can be substantial, requiring that the blades be made sufficiently strong to withstand the resulting stresses. This typically requires extra material to make the blades thicker or stiffer or both, adding to the cost of producing the VAWT. As the blade rotates, it is also subject to aerodynamic forces $F_P^{aero}$, such as the lift discussed above in connection with FIG. 3. These forces are shown notionally in FIG. 5 as varying sinusoidally about a mean value of zero. In a prior art H-rotor VAWT the aerodynamic forces are essentially superimposed on the centrifugal force $CF_P$ in a manner represented by the dashed line $TF_P$. The effect is to magnify the peak centrifugal force CF and introduce unsteadiness, which can shorten blade life due to fatigue. In addition to this fatigue stress, gravity causes the blades 1 cantilevered from the ends of the struts 2 to create significant bending stresses in the struts.

The rotor embodiment depicted in FIG. 4 seeks to alleviate these stresses first by counteracting centrifugal forces on the blades via mounting each blade at an orientation relative to the tangential direction of rotation to generate aerodynamic forces that have a predetermined radially inward component with a mean value specifically designed to counteract outwardly directed centrifugal forces on the blade. This is illustrated notionally in FIG. 6 by showing the mean value of the periodic sinusoidal aerodynamic forces $F^{aero}$ with a reduced magnitude as compared to the prior art mean of $F_P^{aero}$ in FIG. 5. For purposes of illustration, FIG. 6 assumes that the design of the rotor 12 subjects it to a steady-state centrifugal force CF comparable in magnitude to the centrifugal force $CF_P$ in FIG. 5. However, by judiciously designing the rotor 12 in accordance with the description herein, the aerodynamic forces can be tailored to counteract, or in this instance substantially cancel, the centrifugal force, as indicated by the zero value of the mean total force TF in FIG. 6. At the same time the rotor is designed to counteract the weight of the blades by canting the blades 22 and 24 at a tilt angle γ (see FIG. 4), which creates a vertically upward component of the aerodynamic forces, in a manner also described in more detail below.

1. Counteracting Centrifugal and Gravity Forces on the Blades

Figure 7:
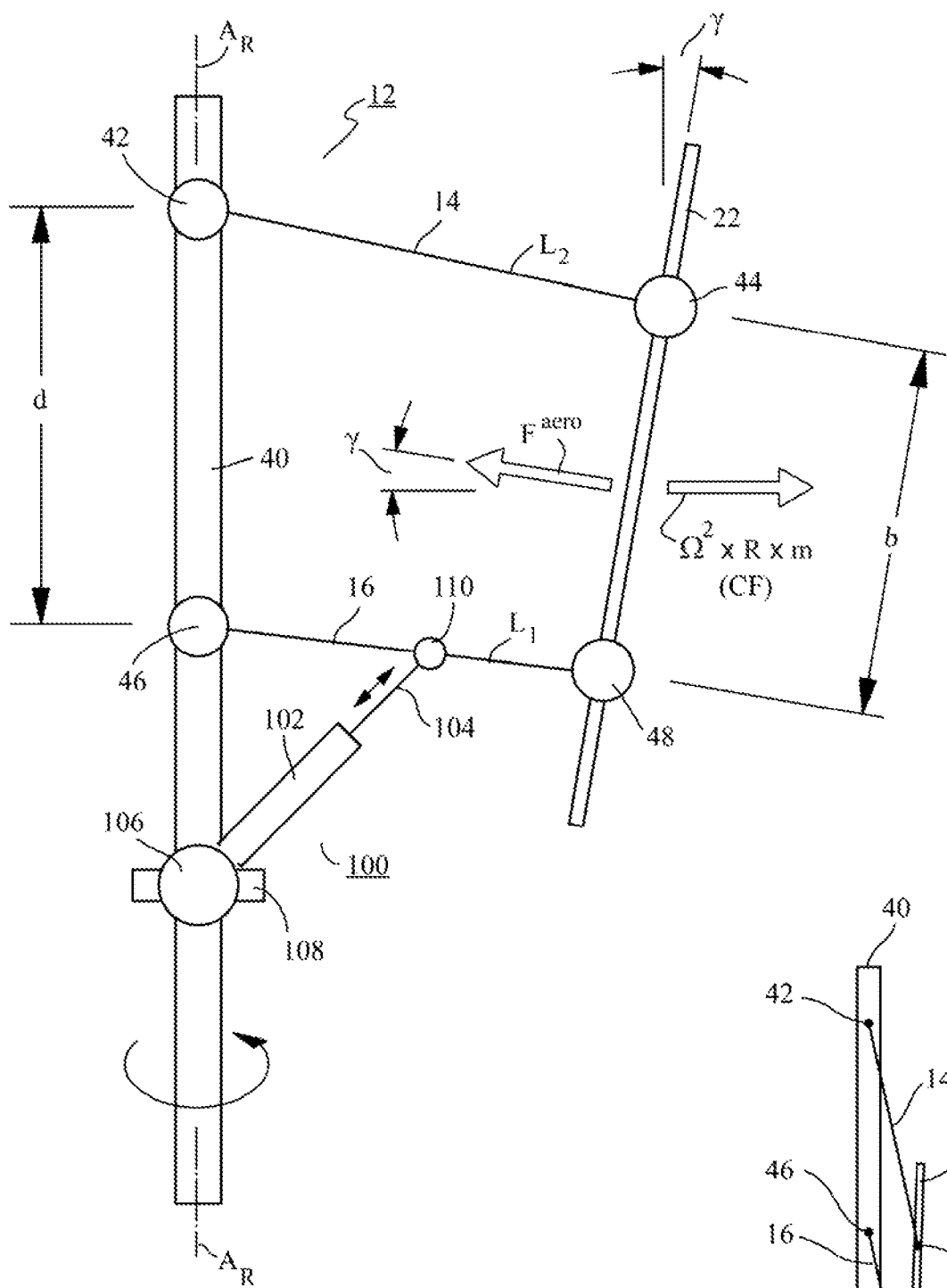
FIG. 7 is a schematic depiction of the operable geometry of an embodiment of the tilted rotor VAWT shown in FIG. 4.

Taking FIGS. 4 and 7 together, the upper struts 14 and 18 are hinged at their ends to upper positions of the rotor shaft and the respective blades 22 and 24, while the lower struts 16 and 20 are hinged at their ends to lower positions of of the rotor shaft and the respective blades 22 and 24. Thus, each strut/blade assembly comprises with the rotating shaft a four-bar linkage, one of which is illustrated schematically in more detail in FIG. 7. The upper strut 14 is connected to the rotor shaft 40 at an upper shaft hinge represented by the circle 42 and to the blade 22 at an upper blade hinge represented by the circle 44. The lower strut 16 is connected to the rotor shaft 40 at a lower shaft hinge represented by the circle 46 and to the blade 22 at a lower blade hinge represented by the circle 48. In an operational configuration depicted in FIG. 7, the struts 14 and 16 are rotated from their stowed position (described in more detail below in connection with FIG. 12) towards the horizontal by centrifugal force. The struts have different lengths $L_1$ (strut 16) and $L_2$ (strut 14), which cause the blade 22 to assume an operational position in which it is tilted outwardly at an angle γ with the vertical.

Figure 8:
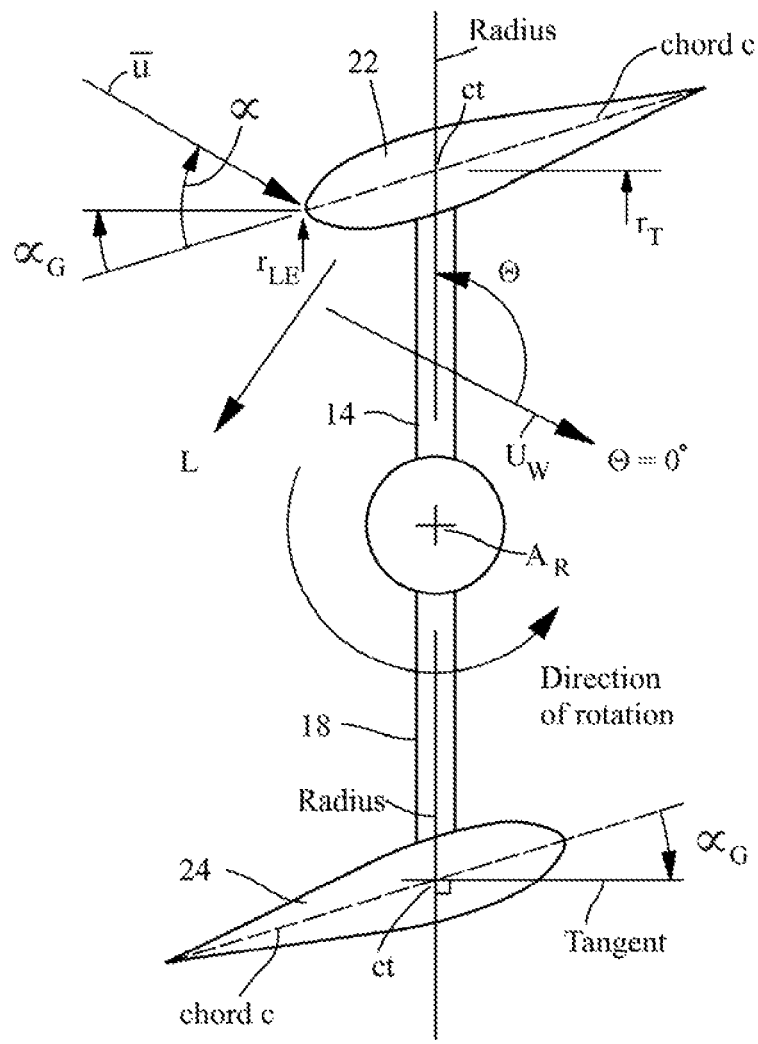
FIG. 8 is a top view of the VAWT in FIG. 4 illustrating one embodiment of a rotor blade having a symmetrical airfoil oriented to provide a centrifugal force cancelling feature as described in connection with FIG. 6.

FIG. 8, which is a top view of the VAWT in FIG. 4, illustrates a blade orientation specifically designed to generate aerodynamic forces that counteract the centrifugal force on the blades as discussed in connection with FIG. 6. For a rotor in its fully operational configuration as shown in FIG. 4, it is possible to set the blade geometric angle of attack $\alpha_G$ toward the end of balancing the steady-state components of aerodynamic and centrifugal loads. The geometric angle of attack $\alpha_G$ is defined herein as shown in FIG. 8, namely as the acute angle between the blade chord c and the tangent to the blade rotational path at a point ct where the path radius intersects the blade chord c. In a simple design, $\alpha_G$ is constant along the blade length (span), but the blade could incorporate variable pitch control that varies $\alpha_G$ with the azimuth angle θ (defined in the next paragraph) and/or twist along its length from s=−h/2 to s=+h/2, where s is the midpoint of the blade span h. In preferred embodiments $\alpha_G$ is less than 90°. As defined herein, α and $\alpha_G$ are measured from the blade chord c and are assigned a negative value when $r_{LE}$ (the radial distance to the blade leading edge) is less than $r_T$ (the radial distance to the point ct). The blades 22 and 24 in the present embodiment have identical symmetrical airfoils, in which the surfaces opposite the chord line are the same. Alternate embodiments can employ airfoils of different shapes such the cambered airfoils discussed further below.

The aerodynamic forces on a blade airfoil with a particular lift coefficient $C_L$ are the result of the lift L perpendicular to the relative wind vector $\bar{u}$ as function of the aerodynamic angle of attack α the vector forms with the blade chord c. The angle of attack α changes periodically as the blade rotates, with the angular position of the blade with respect to the direction of the prevailing wind $U_W$ being defined as the azimuth angle θ. (The lengths of the vectors in the figures are not intended to denote their relative scalar magnitudes.) The tangential component and radial components of $\bar{u}$ are given by the following relations:

$$u_T = \Omega(R + s \sin \gamma) + U_W \sin \theta$$

$$u_R = U_W \cos \theta \cos \gamma$$

Accordingly, $$\alpha(\theta, s) = \alpha_G + \tan^{-1}\left[\frac{u_R}{u_T}\right]$$

Figure 9:
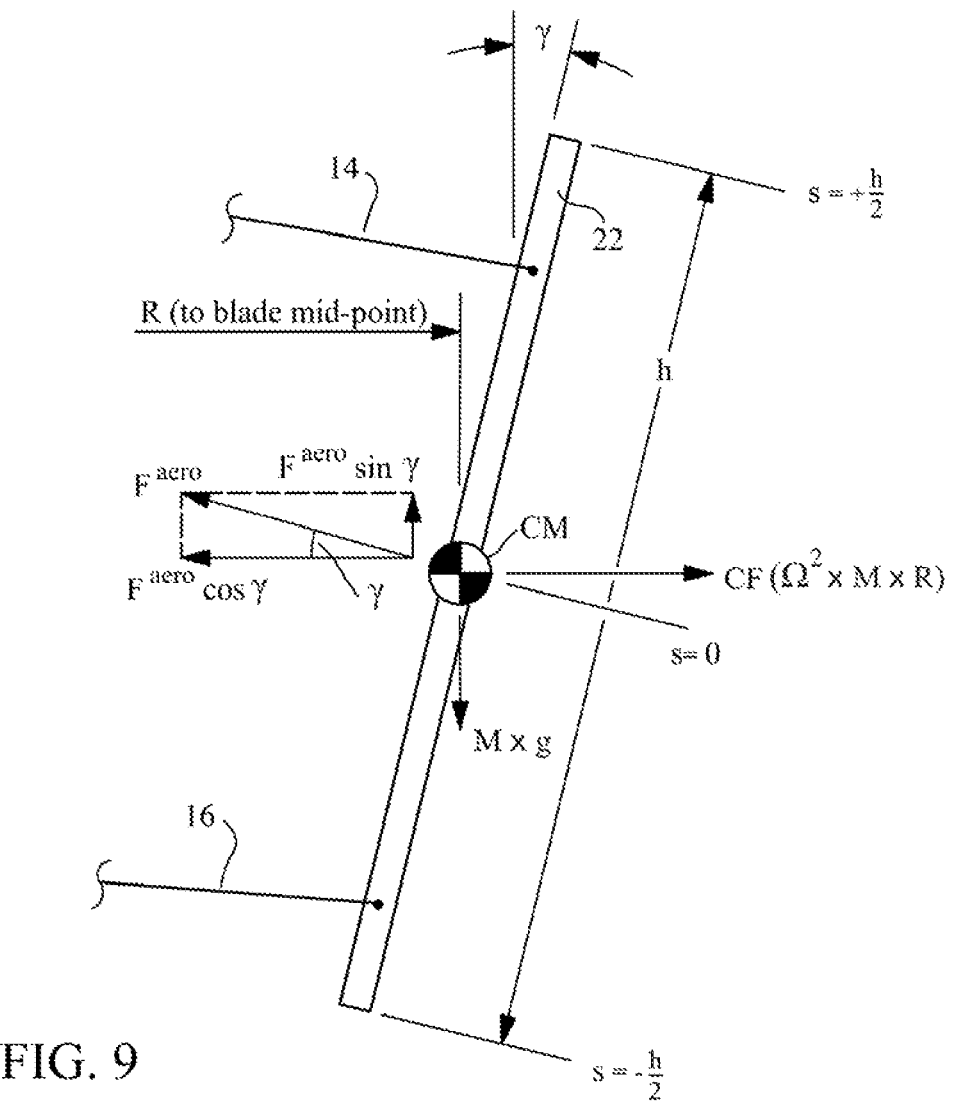
FIG. 9 is a detailed view taken from FIG. 7 illustrating the manner in which components of the combined aerodynamic forces $F^{aero}$ at on the rotor blade airfoil in FIG. 8 counteract gravitational and centrifugal forces on the rotor.

Designing the blade with a properly selected $\alpha_G$, as described below, provides a rotor superior to one having a configuration in which the blade is required to support all of the centrifugal loads which, for a large, utility scale turbine with a radius of 50 m or more, can be several times larger than gravity. This would necessitate multiple struts, heavy blades, and/or advanced materials, all of which increase costs. Also, due to kinematic constraints presented by having more than two struts, discussed in further detail below, not to mention the negative impact on performance due to strut drag, it is preferable in some circumstances to limit the number of struts to two per blade. The net load on each blade must then be carried via blade bending to the two strut attachment locations (for hinged blade/strut connections, no bending moment is transferred to the strut at the hinge point). Thus, to minimize blade bending stresses the average load due to centrifugal and aerodynamic loads should be as close to zero as is practicable. A fluctuating load that varies with blade azimuth θ still remains as a result of the asymmetric aerodynamic lift force experienced by the blade rotating into the prevailing wind as compared to the same force when traveling with the wind. However, this load is smaller than the gross steady state centrifugal load in a prior art VAWT (see FIGS. 5 and 6), and can be supported by less robust, lighter, and less expensive blades As for gravitational forces on the blades, a vertically oriented blade has no force component in the vertical direction and therefore is unable to balance the load due to blade weight. According to the principles described herein, this load is balanced by tilting the blade so that the top end has higher radius than the bottom end, thus producing a vertically upward component of the aerodynamic force that can be used to equilibrate the gravitational load. FIG. 9 shows the loads on a blade with a total mass M. It will be appreciated that the blade can have a nonuniform mass distribution, in which case M is determined by integrating the function of the mass with respect to blade span from s=−h/2 to s=+h/2. For ease of illustration, the mass of blade 22 is assumed to be uniformly distributed along the blade length, and the weight M×g (the acceleration of gravity) is shown as acting at the spanwise center of mass CM(that is, at s=0). The tilt angle γ has a predetermined non-zero value chosen with the goal of balancing the centrifugal force CF and the blade weight M×g with the horizontal and vertical components, respectively, of the total aerodynamic forces $F^{aero}$ acting on the blade. The aerodynamic forces act normal to the blade span, and in a simple case where the blade airfoil configuration is constant along the span and has no twist, $F^{aero}$ can be deemed to act through the spanwise center of mass CM. Accordingly, in an idealized design $F^{aero}(\sin \gamma)$=M×g, and $F^{aero}(\cos \gamma)$=CF=M×R×Ω², where R is the distance from the axis of rotation to the blade midpoint (s=0). Thus, at a particular Ω:

$$\gamma = \tan^{-1}\left[\frac{g}{R \times \Omega^2}\right]$$

Note that the net moment on the blade 22 (for example, about its bottom end) is not zero. For a constant rotation rate Ω, and a local rotation radius r, the aerodynamic loads increase with r² (since lift increases with the square of the flow velocity) and centrifugal loads increase with r, as seen in the above discussion. Because γ>0, at the top of the blade aerodynamic loads exceed centrifugal loads, producing a net inward force. Conversely, at the bottom of the blade where r is less than at mid-span, the net force is radially outward. Accordingly, the tilted blade experiences a moment tending to turn the top of the blade inward. However, this moment is relatively small and can be effectively countered by the struts in tension (lower strut) and compression (upper strut). Alternatively, the blade can be designed to have a small reduction in geometric angle of attack $\alpha_G$ when proceeding from the blade bottom to top (that is, a geometric twist), although that will most likely increase manufacturing costs. Geometric twist can also be used to counter the effect of wind shear and optimize the geometry, for example, to reduce the gross moment on the blade or enhance power output without exceeding target stress levels in the blades, struts, and tower.

2. Alternative Airfoil Shapes

As discussed above, a design principle underlying the VAWT 10 involves orienting the blades at a geometric angle of attack $\alpha_G$ such that the mean aerodynamic force maintains a mean inward component sufficient equal to centrifugal loads on the rotor as it revolves around the rotor axis (see FIG. 6), while also having a mean upward component substantially equal to the rotor weight. The nonsymmetrical airfoil shape shown in FIG. 10 can be used to advantage in place of the symmetrical airfoils of the blades shown in FIG. 8 in achieving that objective. (Features and elements in FIG. 10 that have counterparts in FIG. 8 use the same references, denoted by a prime (') in FIG. 10.)

Figure 10:
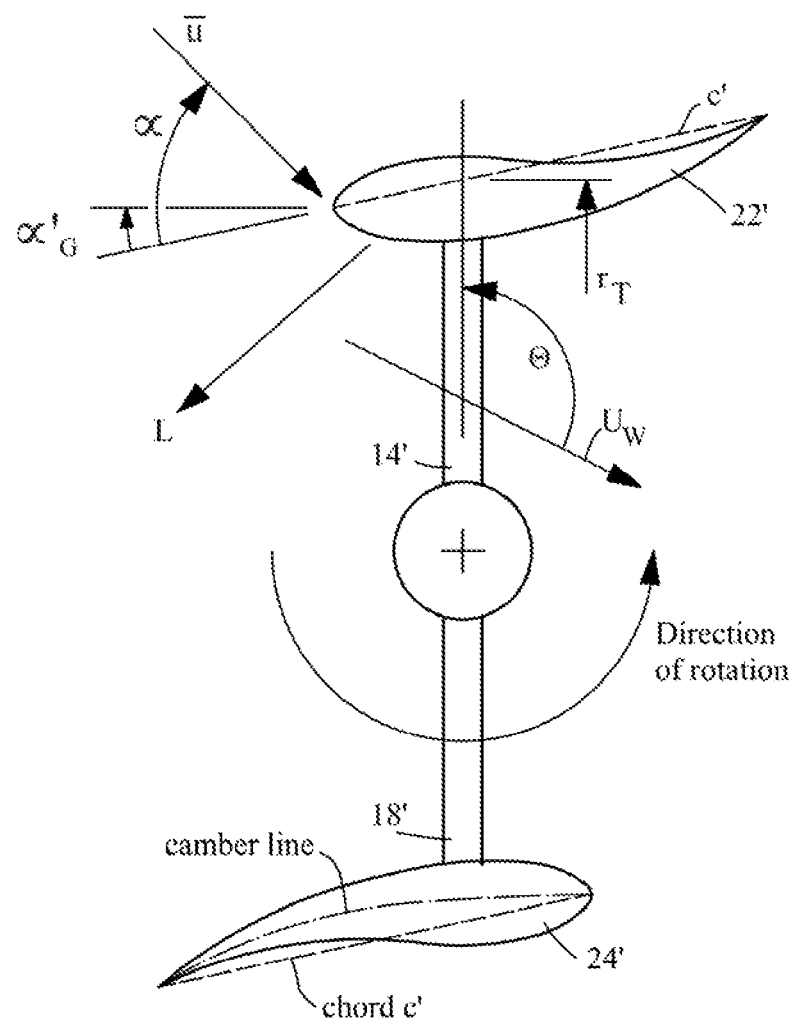
FIG. 10 is a top view of an alternate embodiment of the VAWT in FIG. 4 with a cambered rotor blade airfoil instead of the symmetrical airfoil shown in FIG. 8.

During a complete revolution of the blade around the rotor axis, the aerodynamic angle of attack α fluctuates between maximum and minimum values with respect to $\alpha_G$, and the blades generate a certain amount of lift. The characteristic feature of the blades 22' and 24' shown in FIG. 10 is their cambered airfoil shape, rather than the symmetrical airfoils of the blades 22 and 24 shown in FIG. 8. In a symmetrical airfoil, the chord c coincides with the locus of points equidistant from the top and bottom surfaces of the airfoil from the leading edge to the trailing edge (the camber line). In a cambered airfoil the same locus of points is displaced from the chord c', as indicated in FIG. 10.

Figure 11:
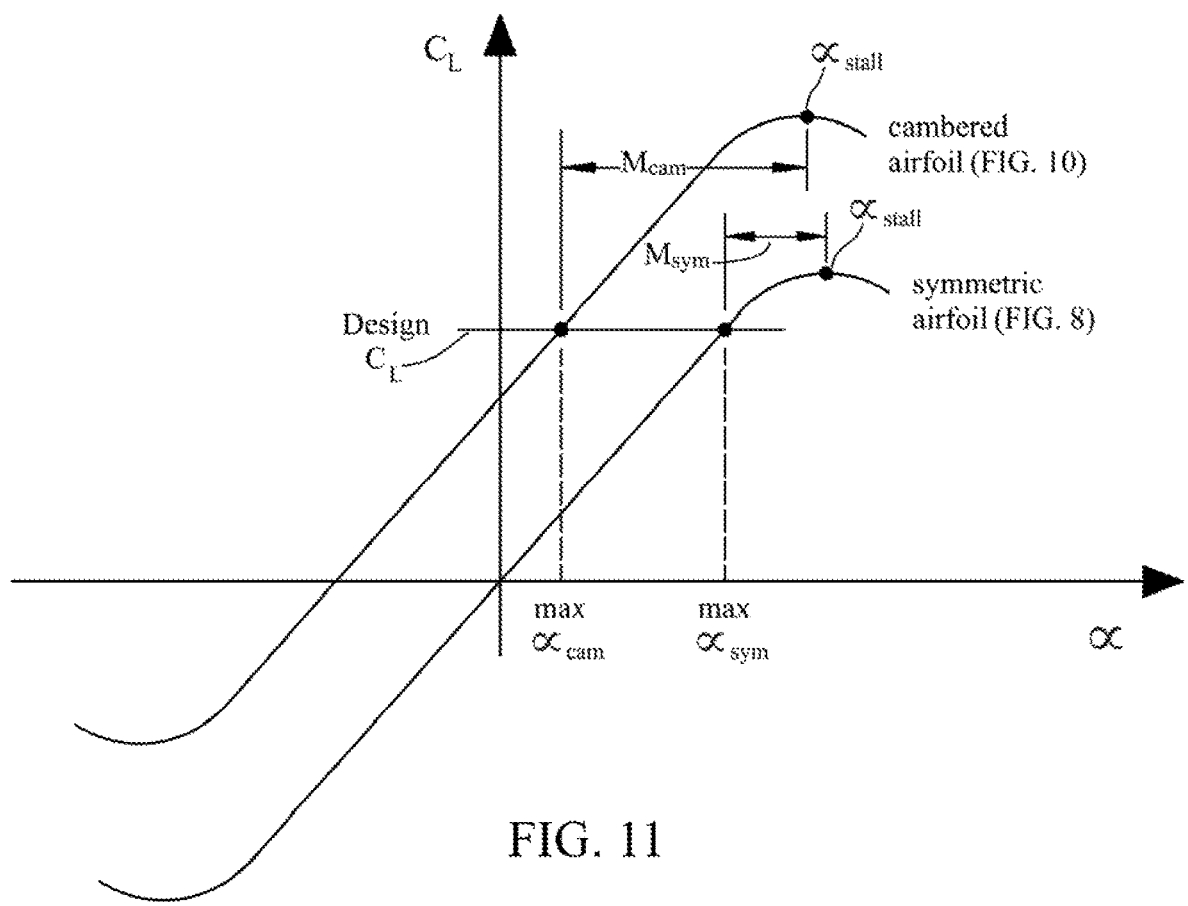
FIG. 11 is a graph illustrating the effect of changes in camber of a rotor blade airfoil on its lift coefficient $C_L$.

It is known that for a given angle of attack α, the amount of lift an airfoil generates depends on its coefficient of lift $C_L$, which is determined by the shape of the airfoil. Stated another way, for a higher value of $C_L$, the same amount of lift is generated at a smaller angle of attack for an airfoil with more camber. FIG. 11 plots lift coefficient $C_L$ vs. angle of attack α for a symmetrical airfoil (FIG. 8) and a cambered airfoil (FIG. 10). This plot shows that for a particular design lift coefficient $C_L$ intended to provide a desired lift, a cambered airfoil can be oriented at a lower geometric angle of attack $\alpha_G$ so that the maximum aerodynamic angle of attack experienced by a cambered blade, max $\alpha_{cam}$, will be lower than the maximum aerodynamic angle of attack, max $\alpha_{sym}$, for a symmetrical blade. This is important because the fluctuation of aerodynamic angle of attack α between maximum and minimum values with respect to $\alpha_G$ during a complete revolution of the blade around the rotor axis will typically bring the maximum value of α for a symmetrical airfoil closer to the aerodynamic stall angle $\alpha_{stall}$. That is, the stall margin $M_{cam}$ of the cambered blade at its max $\alpha_{cam}$ is greater than the stall margin $M_{sym}$ of the symmetrical blade at its max $\alpha_{sym}$. This decreases the likelihood that the blades 22' and 24' will stall during turbine operation and thus increases its performance characteristics.

It will also be appreciated from FIG. 11 that the greater stall margin of cambered airfoils enables the rotor blades to incorporate a larger $\alpha_G$ to provide an increased aerodynamic angle of attack α throughout its travel around the rotor axis. That is, it is possible to operate "higher" on the cambered airfoil's $C_L$ vs. α curve in FIG. 11 and still maintain a safe stall margin. This provides the turbine designer with more flexibility in developing a VAWT that achieves the force balancing goals described herein.

B. Designing Rotor Blades for a Force Canceling Tilted Rotor VAWT

Typically, a wind turbine is designed to meet stated specifications, including a particular power generating capacity at a given wind speed. A common starting point is to choose a swept area of the rotor (the area between the blades 22 and 24 normal to the prevailing wind), which is known to be a principal determinant of turbine capacity. From there, a designer will choose a radius R at blade midspan (s=0). The discussion at pages 9-10 of U.S. provisional application No. 62/178,917, which is incorporated herein by reference, describes a design approach for a tilted rotor VAWT according to the present description that begins by assuming that the tilt angle γ will be small in the final design. For the purpose of setting blade span h, it is initially assumed that γ=0 to determine the blade span that will produce the required swept area.

The initial swept area estimate is used to define ranges for chosen design parameters. Some of the important parameters from a design standpoint include (but are not limited to): total blade length (h), the strut lengths ($L_1$ and $L_2$), the distance between the points where the struts attach to the blades (b), the locations along the blade where the struts attach to the shaft (d), the geometric twist distribution (typically either constant or linearly varying for an initial design) for the blade and struts, the strut and blade airfoil sections (initially assumed constant along the blade and strut spans, but could also vary), materials (such as a composite) used for the blades and struts, and structural geometrical properties of the blade and struts (such as their bending moments of inertia and torsion moment). These and any other design parameters can be used to mathematically model linkage kinematics (discussed further below), forces and moments acting on the blades and struts, estimates of generated power, and material-based constraints on allowable maximum and cyclic stresses. Those skilled in the art will be familiar with commercially available software, or be able to develop suitable algorithms, capable of performing these steps in the design process.

Initially, equations are set up so that at every azimuth the net horizontal and vertical forces and also moment on each strut and the blade for a given geometry and operating condition can be computed. These equations yield the reaction forces and a remaining moment or force that must be zeroed either (i) with an auxiliary actuator force to hold the rotor in place (as discussed further below), or (ii) by adjusting the tilt angle γ. If the latter option is the goal, an equilibrating tilt angle γ may not be found, in which case that particular geometry would be rejected. After the geometry and forces are finalized, the maximum and alternating stresses in the struts and blade are calculated during a revolution. Also the generated power is computed. Designs that exceed the allowable stresses for the structural materials or do not meet the desired power generation level are rejected. Other performance parameters may also be confirmed, such as proximity to blade stall, excessive buckling loads, gyroscopic instability, to name a few.

In conventional wind turbine design the airfoil shape is chosen to achieve desirable lift, drag, and moment at a design operating condition. Here, the airfoil shape and $\alpha_G$ are chosen to achieve the target power generation level at minimum cost while ensuring that stress levels are maintained with acceptable bounds. To that end, a typical VAWT according to the present invention will be designed with a non-zero blade tilt angle γ up to about 20°, more preferably between 1° and 15°, and most preferably between 5° and 10°, to the end of ensuring that the vertical component of lift is large enough to be substantially equal to the blade weight. The acute geometric angle of attack $\alpha_G$ will have a value between −20° and +20°, more preferably between −15° and +15°, and most preferably between 40° and +10°, so that the radial component of the lift is large enough to substantially cancel the centrifugal force, while remaining within the blade stall margin.

C. Designing Struts for a Force Canceling Tilted Blade VAWT

The configuration of the struts 14, 16, 18, and 20 is also an important design consideration for achieving aeroelastic stability, reducing drag, and minimizing torsion and bending moments on the struts. As with blade design, optimizing strut design thus has two aspects: aerodynamic design and stress considerations.

The overall aim in designing the struts is to simultaneously optimize a cost function (for example, material cost, weight, etc.), while achieving the target performance goal (generated power) and maintaining acceptable stresses throughout the structure. All of these parameters, stresses, performance and cost depend on both blade and strut design. Furthermore, while aerodynamic and structural considerations are traditionally approached independently, they are in fact closely coupled in this design and must be approached in an integrated manner. Thus, rather than separate aerodynamic and structural design steps, the present approach considers the optimization process in an integrated and comprehensive manner where cost and design constraints are considered simultaneously, and feasible and optimal designs are obtained by varying the applicable design parameters. In this paradigm the aerodynamic loads act as intermediate variables used in the calculation process, but do not themselves constitute design constraints or performance metrics. Nevertheless, to relate the approach with conventional aero-structural design methods the considerations pertaining to aerodynamic and structural considerations are indicated below.

1. Aerodynamic Considerations in Designing the Struts

The struts will typically have an airfoil cross section to reduce drag, so that many of the aerodynamic considerations addressed in blade design and discussed herein will be applicable to optimizing the strut design from the above standpoints. Common design approaches applicable to the blades and struts include using camber, optimizing twist, and aligning sectional aerodynamic center, elastic axis and center of mass to promote aeroelastic stability, and minimize drag, torsional moments and stresses. For example, a cambered airfoil section as discussed above can be used to reduce drag and/or avoid stall. The relative positioning of the aerodynamic center and center of mass relative to the elastic axis can also be optimized to eliminate or minimize blade and strut torsion loads while maintaining aeroelastic stability. Further, aerodynamic moment can be similarly reduced by utilizing trailing edge tabs or extensions, as discussed above in connection with the blade design. U.S. provisional application No. 62/178,917 includes at pages 5-6 a description of additional details regarding blade and strut aerodynamic design, which description is incorporated herein by reference. The struts can also be used to contribute to the lift provided by the blades by suitably designing and orienting their airfoil shapes.

Another strut design feature tailors aerodynamic forces on the struts to offset net blade loads in a direction orthogonal to the blade elastic axis, so as to minimize bending stresses in the blades and/or minimize actuator loads (see discussion below relating to operation using an actuator to assist in maintaining rotor position). The actuator load also has a component in the direction orthogonal to the strut elastic axis and thus can be balanced in whole or in part by the aerodynamic loads on the strut. Similar to the concept discussed herein of designing a blade and strut layout to produce an invariant (or nearly so) geometry under changing aerodynamic blade loads, tension forces in the strut can balance the net distributed centrifugal and gravity loads on the blades. This can be appreciated by considering the behavior of the VAWT without an actuator load. An equilibrium position can be considered where the aerodynamic, centrifugal, and gravity loads are in equilibrium and the tension loads in the struts are near zero (the blade is effectively flying on its own). Another equilibrium position can also be contemplated where the aerodynamic loads are now zero, but tensile loads in the struts substantially equilibrate the centrifugal and gravitational loads (the device is spinning in a vacuum). If these two equilibrium states can be achieved with the same tilt angle γ, then it is anticipated that as the blade rotates and experiences varying aerodynamic loads, the tilt angle nevertheless remains substantially constant. Nevertheless, even if the overall forces on the strut are in substantial equilibrium under the action of tensile, centrifugal, and gravity, a bending moment on the blade generally will still be present. This is because the centrifugal load varies linearly along the span, whereas the gravity force is a uniform load (assuming that the strut has uniform mass per unit length). Accordingly, there will generally be a linearly varying net force normal to the blade, which can be counteracted with aerodynamic loading on the struts.

2. Structural Considerations in Designing the Struts

Although it might be theoretically possible to eliminate mean loads on the struts and blades as the rotor revolves around the axis, this is not necessarily optimal from the standpoint of the stresses on these parts. In particular, slender structures such as the blades and struts are effective at supporting tension loads, but not as effective in carrying bending or compression loads. Thus, it is generally desirable to minimize bending loads on the blades and struts, while still retaining some tension on them. If the net vertical and mean horizontal forces on the tilted blades are zero, there will in general remain a moment that places the upper strut in tension and the lower one into compression. More generally, wind fluctuations can produce compressive loads in the struts that may exceed buckling limits. Therefore, it may be desirable to relieve some of the aerodynamic load on the blade, or use an airfoil geometry that reduces the component of aerodynamic force in the radial direction while increasing it in the direction of rotation (which would have the effect of producing more power). This would result in a net tension in the struts at all azimuths of blade rotation. An increase in the net tension would not only prevent buckling of the struts, but also enhance their ability to support bending loads due to the geometric stiffening associated with a mean tensile load. In fact, the strut could in principle support the blade even if its bending stiffness were zero.

The blades on the other hand will now experience a net non-zero transverse load distribution which produces a bending moment and bending stresses. In general however, these stresses can be controlled by varying the geometric angle of attack $\alpha_G$ along the blade span in a manner that would minimize bending stresses. For example, near the blade support hinges large net forces can be permitted since moment arms relative to the attachment points are small, thus allowing tension in the struts to be increased while having minimal effect on maximum blade bending stress. An alternative approach would place the strut/blade hinges at predetermined locations that would minimize bending stresses in the blades. For example, classical beam theory shows that in a uniformly loaded beam of length BL, the optimal hinge locations for minimizing the maximum bending stress would be at $(2^{1/2}-1) \times BL/2$ from each end of the beam. A more general formula, but similar equilibrating principle, would apply to the tilted blade, although the loading would generally not be uniform. In general, an optimum design would seek to simultaneously remain below the maximum buckling load the struts are capable of bearing and below allowable stress levels in the struts, while minimizing the overall weight of the struts.

D. Other Design Considerations

One refinement in rotor design that can further the goal of maximizing power generating capacity while increasing efficiency in terms of cost of materials, construction, and operation resides in reducing torsional stresses in the blades, as discussed above. These stresses can cause the blades to twist, which in turn can cause $\alpha_G$ to vary from its design value. These stresses originate not only from non-zero net sectional moments on the airfoil about its elastic axis, as mentioned above, but also if the strut hinge attachment points are offset relative to the blade elastic axis. Thus, properly designing the geometry of the strut-to-blade attachment can reduce or eliminate this source of torsional moments on the blades.

There are also practical restraints on the lengths of the struts and the locations of the points where they connect to the blades and the shaft. One such restraint arises from the need to be able to stow the rotor in the fashion shown in FIG. 12, in which the struts have been moved downward so that the blade to which they are connected can be brought close to the VAWT tower. This position would be assumed by the rotor in a strong prevailing wind beyond that for which it was designed. For the rotor to be able to assume this position the length 12 of the upper strut 14 must be greater than the length $L_1$ of the lower strut 16. In addition, the distance d between the strut/shaft hinges must be greater than the distance h between the strut/blade hinges. In a typical design $\gamma$ is small (less than 10°), which in turn implies that the ratios $L_2/L_1$ and d/h should be slightly higher than, but close to, unity.

Under some circumstances it may be desired to consider the use of one or more additional struts to support the blades. This would not feasible if the upper and lower struts have different lengths, as just discussed, because a third strut attached at a fixed point on the blade would restrict blade motion. However, an additional strut can be used if the hinge point of the one or more additional struts is permitted to translate vertically along the shaft.

II. MODES OF OPERATION OF THE PRESENT EMBODIMENT

There are two principal modes of operation of the tilted rotor VAWT thus far described. One permits the rotor to find its own position with limited or no external restraint on the vertical position of the blades, and the other incorporates an actuator that maintains the rotor in a desired configuration.

Figure 12:
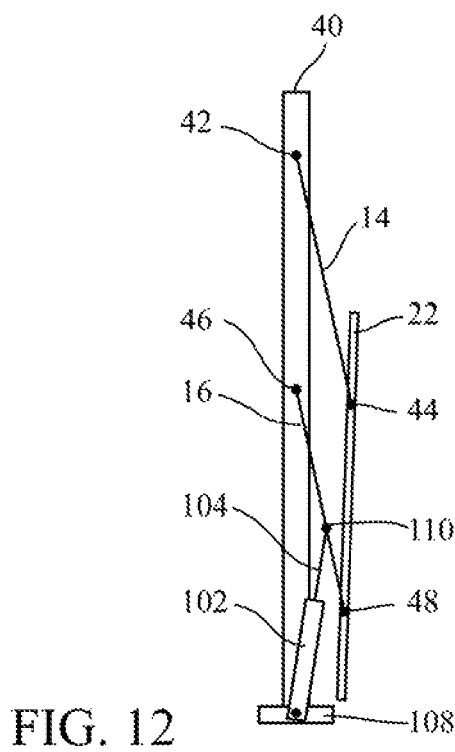
FIG. 12 shows the rotor in FIG. 7 in a furled configuration that protects the VAWT against damage due to strong winds and storm conditions.

Both operational modes will typically involve the use of an actuator 100 represented schematically by the numeral 100 in FIG. 7. The actuator is shown with a hydraulic cylinder 102 that moves a piston 104 linearly in the directions indicated by the arrows adjacent to the piston in FIG. 7. The base of the cylinder 102 is connected at a hinge 106 to a lockable slider 108 that moves vertically on the shaft 40. The distal end of the piston 104 is connected at a hinge 110 to the lower strut 16. As the actuator piston 104 moves in and out of the cylinder, the slider moves to raise and lower the blade 22. FIG. 12 shows the blade 22 in a stowed position discussed in further detail below. With the four-bar linkage arrangement of the present embodiment, the lower strut motion ensures that the blade moves simultaneously upward and the upper strut rotates upward.

1. Restraint-Free Operation

The principal characteristic of this mode of operation is that with no external restraint, each of the four-bar linkages of the shaft, two struts, and their associated rotor blade comprises a dynamic system. The general expectation is that as the blade experiences azimuthally varying aerodynamic loads, an imbalance between the aerodynamic, gravitational, and centrifugal forces will produce a blade motion in which each blade moves up and down as it revolves around the shaft. If the sum of the aerodynamic forces on a blade dips below the mean value, gravitational loads will dominate and the blade move downward. This will produce a reduction in γ which increases the imbalance further, but the increased tension in the struts resulting from the increase in radial force will compensate for the loss of aerodynamic lift. By appropriately positioning the blade/strut hinge positions and overall VAWT geometry, the equilibrium positions of the revolving VAWT at design operation (that is, for the designed mean aerodynamic loads) and when the aerodynamic load is zero (when angle of attack α is zero, and gravitational and centrifugal loads are balanced by strut tension), are identical. If so, it would follow that the VAWT geometry remains substantially invariant as the aerodynamic forces change. An invariant geometry under varying aerodynamic loads will still impart varying loads on the tower (because the strut tension is varying).

In order to assist in blade deployment from the furled/stowed position to the operating state the actuator 100 can function to: (i) assist in blade deployment toward the design operating condition, (ii) retract the blade toward its stowed position (FIG. 12) in high winds, (iii) act as a failsafe by locking the geometry in its intended position and thus prevent geometrical change, and (iv) effect steady and unsteady control laws that change the blade tilt by varying the actuator length during operation under varying conditions and wind/sea states.

2. Fixed Geometry Operation

In this mode the actuator 100 is used to ensure that the blades maintain an invariant position by holding them in place even though the aerodynamic loads vary. As discussed just above, a design goal is a VAWT geometry that does not change during operation even though the aerodynamic forces vary. This is done by ensuring that the equilibrium geometries under mean aerodynamic loads and in the absence of aerodynamic loads are the same. In that case the required actuator force to maintain the rotor position is near zero. Thus the same design principle applied to maintain an invariant rotor geometry during blade rotation also minimizes the actuator force required to lock the rotor in place.

The actuator can also be used to effect steady state control in response to varying wind conditions. The underlying steady state control law can be designed to accomplish several different objectives such as one or more of any of the following: (i) maintaining constant power generation capability, (ii) limiting maximum stress, (iii) maintaining constant rotation rate (to allow for use of simpler and lower cost generators), and (iv) minimizing tower loads. In each case, the actuator would raise or lower the strut arms to meet the target objective.

It is also possible to utilize the actuator device to effect unsteady control using a swashplate device adapted from similar devices used in helicopters, or a tilted collar mechanism. A suitable swashplate device would be constructed to cause the struts and blades to move in a cyclic fashion once per rotation. A similar motion could be accomplished by alternate means, such as periodic actuator deployment, to mention one example, and used to reduce overall forces imparted to the VAWT, mitigate aeroelastic response, counter sea- or wave-induced platform motion and/or enhance stability. In helicopter applications, cyclic pitch is used to cancel out the net moments (normal to the rotation axis) imparted to the helicopter, thereby reducing stresses and vibrations in the fuselage. Using similar principles, optimum swashplate tilt angles (or equivalent cyclic actuator inputs of an alternate mechanism is employed) for a given operating state could be developed to similarly cancel, for example, the net 1-per-rev moments experienced by the tower in the VAWT 10. In general this optimum angle will change with wind state; however, such changes in angle could be implemented in the form of a feedback law or regulator using sensors that, say, measure tower strains and platform response and adjust the tilt angles to reduce the vibratory load.

III. FURTHER MODIFICATIONS AND EMBODIMENTS

The embodiments discussed above all use a linkage arrangement to attach the blades to the shaft so that the blades can change positions under various conditions as described above. However, those skilled in the art will understand that the principles discussed above can be applied to a VAWT in which the struts are rigidly attached to the blades and the shaft so that the blades do not move relative to the struts. The stress- and load-reducing principles discussed above in connection with blades that can move relative to the struts can be applied equally to a rotor with fixed blades.

Another embodiment could retract the rotor by using drag generating devices near the strut-blade connections to slow the rotor. Another embodiment could mount an even numbered plurality of counter-rotating turbines to counter torque-induced rotation of a mounting platform, thus substantially eliminating the net torque on a floating platform for sea-based applications. Yet another embodiment could employ a single strut supporting each blade, with the VAWT designed in accordance with the principles discussed herein to counteract centrifugal and gravity loads.

IV. SUMMARY AND CONCLUSION

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A lift-driven wind turbine comprising a turbine rotor having at least two rotor blades mounted to a rotatable shaft, wherein:
   at least a portion of each blade is spaced radially from the shaft;
   said portion of each blade comprises an airfoil with a leading edge facing the direction of blade rotation and having predetermined aerodynamic characteristics for generating on the blade a lift force having a component in the direction of rotation with a magnitude capable of rotating the shaft in the presence of a prevailing wind;
   each blade has a predetermined configuration and aerodynamic characteristics that generate on the blade a lift force radial component with a magnitude that varies as the blade rotates; and
   the lift force radial component generated on each rotating blade by its predetermined blade configuration and aerodynamic characteristics has a mean value over one revolution of the shaft that is directed radially inwardly for counteracting centrifugal force on the rotating blade.

2. A wind turbine as in claim 1, wherein the mean value of the lift force radial component on each blade over one revolution of the shaft is substantially equal to the centrifugal force on the rotating blade at a predetermined velocity of the prevailing wind.

3. A wind turbine as in claim 1, wherein the predetermined configuration and aerodynamic characteristics of each blade further generate on each blade an upwardly directed lift force component for counteracting the weight of the rotating blade.

4. A wind turbine as in claim 3, wherein the mean value of the upwardly directed lift force component on each blade is substantially equal to the weight of the rotating blade at a predetermined velocity of the prevailing wind over one revolution of the shaft.

5. A wind turbine as in claim 1, wherein each blade is mounted to the shaft by one or more members, and the mean value of the lift force radial component on each blade counteracts centrifugal force on the rotating blade and the one or more members that mount it to the shaft.

6. A wind turbine as in claim 5, wherein the mean value of the lift force radial component on each blade over one revolution of the shaft is substantially equal to the centrifugal force on the rotating blade and the one or more members at a predetermined velocity of the prevailing wind.

7. A wind turbine as in claim 5, wherein the predetermined configuration and aerodynamic characteristics of each blade further generate an upwardly directed lift force component for counteracting the weight of the rotating blade and the one or more members.

8. A wind turbine as in claim 7, wherein the mean value of the upwardly directed lift force component on each blade is substantially equal to the weight of the rotating blade and the one or more members over one revolution of the shaft at a predetermined velocity of the prevailing wind.

9. A wind turbine as in claim 5, wherein:
at least a portion of one of the one or more members mounting each blade to the shaft comprises an airfoil having predetermined aerodynamic characteristics, with the member airfoil leading edge facing the direction of blade rotation for generating a lift force; and
each member has a predetermined configuration and aerodynamic characteristics for generating on the member a lift force with a radial component having a mean value over one revolution of the shaft that is directed inwardly for counteracting the centrifugal force on the blade and the one or more members that mount it to the shaft.

10. A wind turbine as in claim 9, wherein the predetermined configuration and aerodynamic characteristics of each blade and the at least one member further generate upwardly directed lift force components on each blade and the at least one member with a mean value over one revolution of the shaft that is substantially equal to the weight of the blade and the at least one member at a predetermined velocity of the prevailing wind.

11. A wind turbine as in claim 5, wherein the predetermined configuration and aerodynamic characteristics of each blade generate on the blade an upwardly directed lift force component, the mean value of the upwardly directed lift force component on each blade over one revolution of the shaft being substantially equal to the weight of the rotating blade and the one or more members at a predetermined velocity of the prevailing wind.

12. A wind turbine as in claim 5, wherein the at least one member is pivotally mounted to the shaft and the associated blade.

13. A wind turbine as in claim 12, wherein the at least one member is mounted to the shaft and the associated blade at hinges.

14. A wind turbine as in claim 13, wherein the at least one member is substantially straight for its entire length.

15. A wind turbine as in claim 1, wherein the predetermined configuration and aerodynamic characteristics of each blade comprise a geometric angle of attack $\alpha_G$ formed between a tangent to the blade rotational path and a chord line of the blade airfoil along the portion of the blade with $\alpha_G$ chosen so that the lift force radial component on each blade has a predetermined mean value over one revolution for counteracting centrifugal force on the rotating blade at a predetermined velocity of the prevailing wind.

16. A wind turbine as in claim 15, wherein the blade has a fixed shape and $\alpha_G$ varies along the portion of the blade.

17. A wind turbine as in claim 15, wherein the blade has a fixed shape and $\alpha_G$ is fixed along the portion of the blade.

18. A lift-driven wind turbine comprising a turbine rotor having at least two rotor blades mounted to a rotatable shaft, wherein:
at least a portion of each blade is spaced radially from the shaft;
said portion of each blade comprises an airfoil with a leading edge facing the direction of blade rotation and having predetermined aerodynamic characteristics for generating on the blade a lift force having a component in the direction of rotation with a magnitude capable of rotating the shaft in the presence of a prevailing wind; and
each blade has a predetermined configuration and aerodynamic characteristics that generate on the blade an upwardly directed lift force component having a mean value over one revolution of the shaft substantially equal to the weight of the rotating blade at a predetermined velocity of the prevailing wind.

19. A wind turbine as in claim 18, wherein each blade is mounted to the shaft by one or more members, and each blade has a predetermined configuration and aerodynamic characteristics such that the mean value of the upwardly directed lift force component on each blade over one revolution of the shaft is substantially equal to the weight of the rotating blade and the one or more members that mount it to the shaft at the predetermined velocity of the prevailing wind.

20. A wind turbine as in claim 19, wherein the at least one member is pivotally mounted to the shaft and the associated blade.

21. A wind turbine as in claim 20, wherein the at least one member is mounted to the shaft and the associated blade at hinges.

22. A wind turbine as in claim 21, wherein the at least one member is substantially straight for its entire length.

23. A wind turbine as in claim 18, wherein:
each blade is mounted to the rotatable shaft by one or more members;
at least a portion of each of the one or more members mounting each blade to the shaft comprises an airfoil having predetermined aerodynamic characteristics, with the member airfoil leading edge facing the direction of blade rotation for generating a lift force;
each member has a predetermined configuration and aerodynamic characteristics for generating on the member an upwardly directed lift force component for counteracting the weight of the rotating blade and the one or more members that mount it to the shaft; and the mean value of the total of the upwardly directed lift force components generated by each blade and the one or more members that mount it to the shaft over one revolution of the shaft is substantially equal to the weight of the blade and the one or more members at the predetermined velocity of the prevailing wind.

24. A wind turbine as in claim 18, wherein the top of the portion of each blade is mounted farther from the shaft than the bottom of the portion.

25. A wind turbine as in claim 18, wherein the blade is substantially straight for its entire length and forms an angle γ with vertical when the shaft is substantially vertical.

26. A wind turbine as in claim 25, wherein 0<γ≤20°.

27. A wind turbine as in claim 26, wherein 5°≤γ≤10°.

28. A wind turbine including a turbine rotor having at least two substantially identical rotor blades and two struts mounting each blade to a rotatable shaft operatively coupled to electrical generating apparatus, wherein:

at least a portion of each blade is spaced radially from the shaft;

said portion of each blade comprises an airfoil with a leading edge facing the direction of blade rotation and having predetermined aerodynamic characteristics for generating on the blade a lift force having a component in the direction of rotation with a magnitude capable of rotating the shaft in the presence of a prevailing wind;

the struts comprise an upper strut and a lower strut pivotally mounted to the shaft and associated blade, with the upper strut mounted to the shaft and the associated blade at respective vertical heights greater than the lower strut;

the upper struts are substantially identical and the lower struts are substantially identical, with the upper struts being longer than the lower struts so that the top of the portion of the blade is farther from the shaft than the bottom of the portion;

each blade and its associated struts comprise a four-bar linkage permitting radial movement of the blades relative to the shaft between a rotor operative position in which the blades are spaced from the shaft for rotation by the prevailing wind to drive the electrical generating apparatus and a rotor stowed position in which the blades are proximate to the shaft for protection from excessive prevailing winds; and the blades have a predetermined configuration and aerodynamic characteristics that generate on the blades an upwardly directed lift force component that has a mean value over one revolution of the shaft substantially equal to the weight of the rotating blades and struts at a predetermined velocity of the prevailing wind to urge the blades into the operative position.

29. A wind turbine as in claim 28, further comprising an actuator operatively connected to the rotor for moving the blades between the operative position and the stowed position.

30. A wind turbine as in claim 29, wherein the actuator is operative to hold the rotor blades at a predetermined radial position relative to the shaft.

31. A wind turbine as in claim 28, wherein the mean value of the total upwardly directed lift force component on each blade over one revolution of the shaft is substantially equal to the weight of the rotating blade and its associated struts at the predetermined velocity of the prevailing wind.

32. A wind turbine as in claim 31, further comprising an actuator operatively connected to the rotor for moving the blades between the operative position and the stowed position.

33. A wind turbine as in claim 28, wherein each strut is mounted to the shaft and the associated blade at hinges.

34. A wind turbine as in claim 33, wherein each strut is substantially straight for its entire length.

* * * * *

UNITED STATES PATENT AND TRADEMARK OFFICE
CERTIFICATE OF CORRECTION

Page 1 of 1

PATENT NO. : 10,626,848 B2
APPLICATION NO. : 16/239765
DATED : April 21, 2020
INVENTOR(S) : Alexander H. Boschitsch et al.

It is certified that error appears in the above-identified patent and that said Letters Patent is hereby corrected as shown below:

On the Title Page

At (72) Inventors, "Glen D. Whitehouse" should read: --Glen R. Whitehouse--

Signed and Sealed this
Seventh Day of July, 2020

Andrei Iancu
*Director of the United States Patent and Trademark Office*